(No Model.)

R. S. WARING.
ELECTRIC CABLE.

No. 294,541. Patented Mar. 4, 1884.

Witnesses
C. L. Parker
R. H. Whittlesey

Inventor
Richard S. Waring
by George H. Christy
His Attorney

UNITED STATES PATENT OFFICE.

RICHARD S. WARING, OF PITTSBURG, PENNSYLVANIA.

ELECTRIC CABLE.

SPECIFICATION forming part of Letters Patent No. 294,541, dated March 4, 1884.

Application filed August 9, 1883. (No model.)

*To all whom it may concern:*

Be it known that I, RICHARD S. WARING, a citizen of the United States, residing at Pittsburg, county of Allegheny, State of Pennsylvania, have invented or discovered a new and useful Improvement in Electric Cables; and I do hereby declare the following to be a full, clear, concise, and exact description thereof, reference being had to the accompanying drawings, making a part of this specification, in which—like letters indicating like parts—

Figure 1:
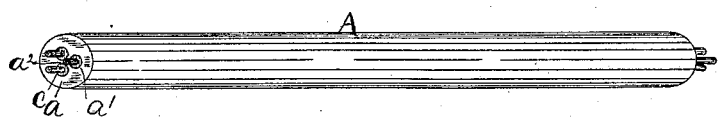
Figure 2:

Figure 1 is a perspective view of my improved cable, and Fig. 2 is a transverse sectional view of the same.

My invention relates to certain improvements in compound electric cables; and, in general terms, it consists of a cable having a soft-metal body, of rounded form, with passages therethrough inclosing insulated conducting-wires, such wires being arranged at equal intervals around the solid soft-metal core or center, as hereinafter more fully described and claimed.

In making compound cables of the class to which my invention relates it is desirable that the wires be in as close proximity as possible, and at the same time secure continuous unbroken walls of enveloping metal inclosing each of the several wires, and that the greater part or bulk of metal in the body or covering should be outside of or surrounding the exterior of the wires. Continuous and unbroken walls between and enveloping the wires are required, for the double purpose of preventing electrical induction and excluding from the insulating material all trace of moisture or other agencies liable to deteriorate or injure its electrical insulating properties. For this latter purpose it is also desirable that the center or core of the cable should be filled solid, by preference with the soft metal of the body, because a tubular passage in the center or core is liable to admit moist air, and such moisture, condensing on the metal wall, may find its way through minute pores or "blowholes" to the insulating material, and thereby supply the requisite elements for developing a weak but troublesome electric or electrolytic action detrimental to the best working of the cable. These minute openings are much more liable to appear on inner than upon outer surfaces, owing to the difficulty of making complete adhesive union in the soft metal by such supply and pressure as can be forced between and around wires arranged around the center, and this difficulty is greatly increased when attempt is made to form a tubular passage in the center or core.

In order to meet the requirements and secure the advantages above noted, I make my improved cable A as follows: A body, $a$, by preference of lead, (though other soft ductile metal or equivalent alloy may be employed,) is given a rounded exterior form by means of the die-opening of the cable-press. This body is made solid and unbroken throughout its mass, with the exception of passages $a'$, formed by the wire-holding mandrel of the press, which passages inclose each an insulated conducting-wire, $c$. I prefer to include three such wires in the cable, arranged at equal intervals around the central core of metal $a^2$, such core being integral with and connected by unbroken walls with the outer body of metal covering. These wires may be described as occupying relative positions corresponding to the angles of an equilateral triangle, the axis of the cable as a whole and of such triangle being coincident. This feature of triangular arrangement is provided with reference to facilitating flow of lead into the spaces between wires, so that lead entering between wires from opposite sides may completely fill the center, and, uniting under pressure, may form complete unbroken inner walls of covering for each and all the wires. In this arrangement, three wires may be grouped so closely as to require but little more lead to cover them safely than is ordinarily required for one wire. This affords great advantage and economy in manufacture, since the cost of lead forms a very large part of the total cost of such a cable. This grouping of wires also affords an advantageous method of making cables containing a large number of wires by arranging them in groups of three, each group being substantially a reproduction of the cable herein shown and described, except that its body of covering is formed as a part of and integral with others, thereby uniting such groups into one common whole.

I do not claim herein such method of compounding groups of cable-wires, nor a cable so made, as the same, in so far as it may contain patentable invention, is included in the subject-matter of a separate application.

I have also included in another application a mandrel specially adapted to make the cable herein shown, and therefore I make no claim to it herein.

I am aware that three or more separate insulated wires have been twisted together, making one strand, which has been covered tightly by a pipe-like envelope of lead; but this does not embrace my present invention, in which the three wires are each inclosed in its appropriate passage within and completely surrounded by the common solid or axially filled lead body.

I claim herein as my invention—

1. An electric cable having a body of lead having passages therethrough at intervals around and in close proximity to its solid center, the thickness of metal wall between wires being less than the thickness of covering surrounding such wires, substantially as set forth.

2. An electric cable having a body, $a$, of lead, such body inclosing three separate insulated conducting-wires, $c$, arranged at equal intervals around and in close proximity to the solid core $a^2$ of the body, the thickness of metal walls between wires being less than the thickness of exterior metal covering, substantially as set forth.

In testimony whereof I have hereunto set my hand.

RICHARD S. WARING.

Witnesses:
R. H. WHITTLESEY,
C. L. PARKER.